United States Patent
Woo et al.

(10) Patent No.: US 10,001,827 B2
(45) Date of Patent: Jun. 19, 2018

(54) POWER MANAGEMENT METHOD USING FABRIC NETWORK AND FABRIC NETWORK SYSTEM USING POWER MANAGEMENT METHOD

(71) Applicant: Samsung Electronics Co., Ltd., Suwon-si, Gyeonggi-do (KR)

(72) Inventors: Jung-hyo Woo, Seoul (KR); Hyun-joo Maeng, Goyang-si (KR); Jeong-uk Kang, Bucheon-si (KR); I-saac Baek, Hwaseong-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 45 days.

(21) Appl. No.: 15/291,266

(22) Filed: Oct. 12, 2016

(65) Prior Publication Data

US 2017/0147056 A1    May 25, 2017

(30) Foreign Application Priority Data

Nov. 23, 2015 (KR) .................. 10-2015-0163982

(51) Int. Cl.
*G06F 1/32* (2006.01)
*G06F 11/30* (2006.01)
*G06F 11/32* (2006.01)
*G06F 11/34* (2006.01)

(52) U.S. Cl.
CPC .......... *G06F 1/3209* (2013.01); *G06F 1/324* (2013.01); *G06F 1/3268* (2013.01); *G06F 1/3275* (2013.01); *G06F 11/3027* (2013.01); *G06F 11/3041* (2013.01); *G06F 11/3051* (2013.01); *G06F 11/328* (2013.01); *G06F 11/349* (2013.01); *Y02B 60/1217* (2013.01); *Y02B 60/1228* (2013.01); *Y02B 60/1246* (2013.01)

(58) Field of Classification Search
CPC .... G06F 1/3209; G06F 1/3268; G06F 1/3275; G06F 11/3041; G06F 11/3051; G06F 11/3027; G06F 11/349
See application file for complete search history.

(56) References Cited

U.S. PATENT DOCUMENTS 5,583,995 A * 12/1996 Gardner ............. G06F 11/1076
                                                         348/E7.071
7,099,969 B2    8/2006  McAfee et al.
7,305,520 B2   12/2007  Voigt et al.
(Continued)

*Primary Examiner* — Stefan Stoynov
(74) *Attorney, Agent, or Firm* — Harness, Dickey & Pierce, P.L.C.

(57) ABSTRACT

A power management method includes monitoring a status of an external interface of external interfaces between the fabric network and at least one host, and a status of an internal interface of internal interfaces between the fabric network and at least one storage device of a plurality of storage devices. The power management method further includes calculating aggregate information of bandwidths of internal interfaces of the plurality of storage devices based on the monitoring, the at least one storage device connected to the at least one host. The method further includes adjusting the bandwidths of the internal interfaces such that the aggregate information of the bandwidths of the internal interfaces is within a threshold range, the threshold range based on a bandwidth of the external interface connected to the at least one host.

20 Claims, 18 Drawing Sheets

(56) References Cited

U.S. PATENT DOCUMENTS

| | | | |
|---|---|---|---|
| 7,428,624 B2 * | 9/2008 | Fujita | G06F 3/0613 |
| | | | 709/213 |
| 7,634,587 B2 | 12/2009 | Ferguson et al. | |
| 7,653,773 B2 | 1/2010 | Larson et al. | |
| 7,660,925 B2 | 2/2010 | Larson et al. | |
| 8,214,551 B2 | 7/2012 | Coronado et al. | |
| 8,904,077 B1 | 12/2014 | Alston | |
| 9,537,743 B2 * | 1/2017 | Deshpande | H04L 43/0894 |
| 2007/0239925 A1 | 10/2007 | Koishi | |
| 2012/0166829 A1 | 6/2012 | Jinno et al. | |
| 2015/0046626 A1 | 2/2015 | Cowell | |

* cited by examiner

POWER MANAGEMENT METHOD USING FABRIC NETWORK AND FABRIC NETWORK SYSTEM USING POWER MANAGEMENT METHOD

CROSS-REFERENCE TO RELATED APPLICATION

This application claims priority under 35 U.S.C. § 119(a) from Korean Patent Application No. 10-2015-0163982, filed on Nov. 23, 2015, in the Korean Intellectual Property Office (KIPO), the disclosure of which is incorporated herein in its entirety by reference.

BACKGROUND

1. Field

Example embodiments of inventive concepts relate to fabric network systems, apparatuses using a fabric network, power management methods using a fabric network and fabric network systems using the power management method.

2. Description of Related Art

In general, when a storage system is configured to use a fabric network, a total sum of bandwidths of an internal interface connected to an internal storage device is substantially higher than a bandwidth of an external interface connected to an external host device.

SUMMARY

Example embodiments of inventive concepts provides a power management method using a fabric network for reducing power consumption of storage devices while maintaining input/output (I/O) performance required by a host.

Example embodiments of inventive concepts also provided a fabric network system for reducing power consumption of storage devices while maintaining I/O performance required by a host.

According to an example embodiment of inventive concepts, there is provided a power management method using a fabric network, the power management method including monitoring a status of at least one of a number of external interfaces between the fabric network and at least one host, and monitoring a status of at least one of a plurality of internal interfaces between the fabric network and at least one storage device, the at least one host configured to access the at least one storage device through the fabric network. The power management method further including calculating aggregate information of bandwidths of the plurality of internal interfaces based on the monitoring of the status of the at least one of the number of external interfaces and the at least one host. The power management method further including adjusting the bandwidths of the plurality of internal interfaces such that the aggregate information of the bandwidths of the plurality of internal interfaces is within a threshold range, the threshold range being based on a bandwidth of the at least one of the number of external interfaces connected to the at least one host.

According to another example embodiment of inventive concepts, there is provided a fabric network system including a fabric network including a plurality of ports, and the fabric network configured to support communication between a host and a plurality of storage devices, the plurality of storage devices connected to access the ports. The fabric network system further comprising a monitor and a controller. The monitor configured to monitor a status of an external interface connected to the host, and monitor statuses of internal interfaces connected to the plurality of storage devices. The controller configured to adjust bandwidths of the internal interfaces based on the monitored status of the external interface and the monitored statuses of the internal interfaces such that a bandwidth required by the host is maintained and power consumption of the storage devices is reduced.

According to another example embodiment of inventive concepts, a power management method comprising calculating aggregate information of bandwidths of a plurality of storage devices in a storage system, each of the plurality of storage devices configured to access a host connected to a fabric network in the storage system; and reducing power consumption of the plurality of storage devices by adjusting bandwidths of internal interfaces between the fabric network and the plurality of storage devices based on (i) the calculated aggregate information of the bandwidths of the plurality of storage devices, and (ii) a bandwidth of an external interface between the host and the fabric network.

BRIEF DESCRIPTION OF THE DRAWINGS

Example embodiments of inventive concepts will be more clearly understood from the following detailed description taken in conjunction with the accompanying drawings in which.

DETAILED DESCRIPTION OF EXAMPLE EMBODIMENTS

Figure 1:
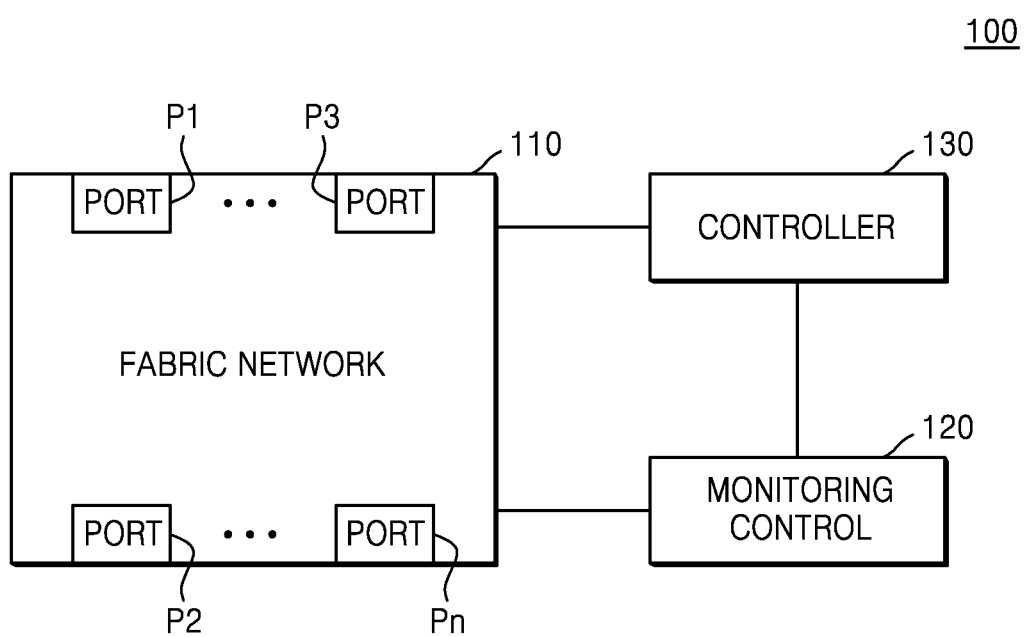
FIG. 1 is an example diagram of a fabric network system according to an example embodiment of inventive concepts.

Example embodiments will now be described more fully with reference to the accompanying drawings, in which example embodiments are shown.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 is an example diagram of a fabric network system 100 according to an example embodiment of inventive concepts.

Referring to FIG. 1, the fabric network system 100 includes a fabric network 110, a monitoring control 120, and a controller 130.

The fabric network 110 may include a plurality of ports P1 to Pn and support communication between devices that access the ports P1 to Pn. Computers, set-top boxes, servers, digital cameras, navigation devices, portable devices, storage devices, and the like may access the ports P1 to Pn. For example, at least one host and at least one storage device may access the ports P1 to Pn.

The fabric network 110 may perform communication connection between the ports P1 to Pn via at least one switching node. When a plurality of switching nodes are included, the ports P1 to Pn of the fabric network 110 may be connected and communicate via a plurality of paths.

The monitoring control 120 may monitor a status of an external interface connected to a host that accesses the ports P1 to Pn of the fabric network 110, and also monitor a status of an internal interface connected to a storage device that accesses the ports P1 to Pn of the fabric network 110. According to an example embodiment, an interface between the fabric network 110 and the host is defined as an external interface, and an interface between the fabric network 110 and the storage device is defined as an internal interface.

For example, the monitoring control 120 may detect a bandwidth of an external interface based on external interface bandwidth configuration received from the host accessing the ports P1 to Pn of the fabric network 110. Also, the monitoring control 120 may detect an internal interface bandwidth based on internal interface bandwidth configuration received from the storage device connected to the ports P1 to Pn of the fabric network 110.

The controller 130 may adjust bandwidths of interfaces connected to storage devices based on the status of the external interface and the status of the internal interface monitored by the monitoring control 120.

For example, the controller 130 may calculate aggregate information of the bandwidths of the internal interfaces of the storage devices that access the host connected to the fabric network 110. Also, the controller 130 may adjust the bandwidths of the internal interfaces such that the calculated aggregate information of the bandwidths of the internal interfaces is within a threshold range based on the bandwidth of the external interface connected to the host.

In another example, when a plurality of hosts access the fabric network 110, the controller 130 may calculate aggregate information of bandwidths of internal interfaces of storage devices. The plurality of storage devices may be connected to the plurality of hosts. In other words, the aggregate information of bandwidths of internal interfaces of storage devices is calculated if the fabric network 110 is accessed by the plurality of hosts. Also, the controller 130 may adjust the bandwidths of the internal interfaces such that the calculated aggregate information is within a threshold range of the bandwidths of the internal interfaces. That is, for example, for the calculated aggregate information to be within the threshold range, the bandwidths of the internal interfaces may be adjusted by the controller 130. The threshold range may be based on the bandwidth of the external interfaces connected to the plurality of hosts.

In an example embodiment, the threshold range based on the bandwidth of the external interface may be determined based on a correlation between the number of storage devices that access the fabric network 110, input/output (I/O) performance according to the bandwidths of the internal interfaces, and power consumption of the storage devices.

For example, a minimum bandwidth of a threshold range based on the bandwidth of the external interface may be a sum of a bandwidth of an external interface of a host and a first threshold value, and a maximum bandwidth of the threshold range may be a sum of the bandwidth of the external interface of the host and a second threshold value. The second threshold value may be greater than the first threshold value.

For example, the first and second threshold values may be determined based on simulations or experiment statistics such that I/O performance according to the bandwidth of the external interface of the host is maintained, and power consumption of the storage devices connected to the host is reduced.

Based on the bandwidths of the storage devices that access the fabric network 110, the controller 130 may classify the storage devices with identical bandwidths into groups. Also, the controller 130 may map a different group of storage devices to each host according to the bandwidths required by the hosts that access the fabric network 110. For example, based on the calculated aggregate information of the bandwidths of the internal interfaces and the bandwidth of the external device connected to the host, the controller 130 may adjust the bandwidths of the internal interfaces connected to the storage devices for each bandwidth group.

Figure 2:
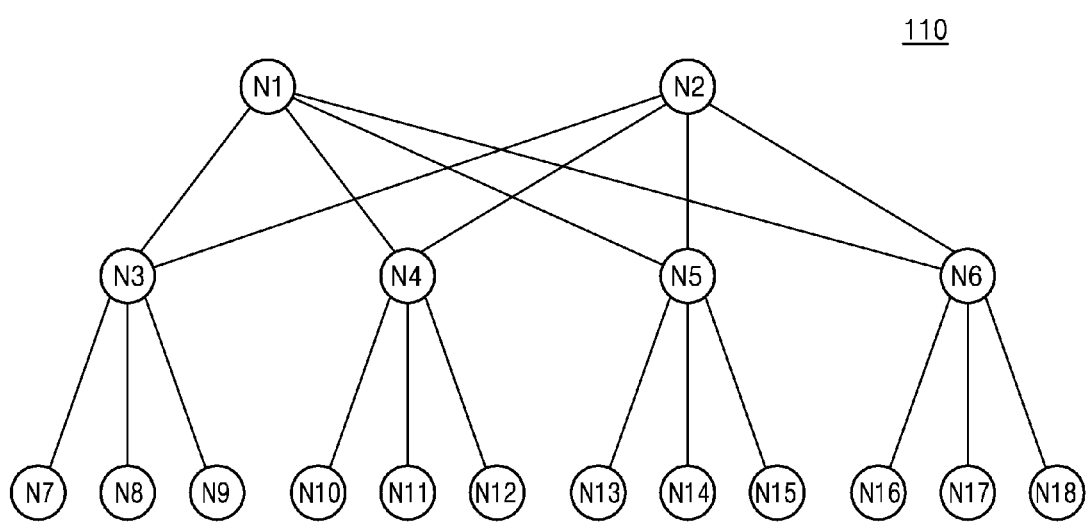
FIG. 2 is a detailed diagram of an example of a fabric network of FIG. 1.

FIG. 2 is a detailed diagram of an example of the fabric network 110 of FIG. 1.

As shown in FIG. 2, the fabric network 110 may include a plurality of switching nodes N1 to N18. Although there are eighteen switching nodes according to the example embodiment shown in FIG. 2, more or less switching nodes may be included depending on the number of devices that access the fabric network 110.

Each of the switching nodes N1 to N18 includes a fabric switch. The switching nodes N1 to N18 are interconnected by a plurality of paths. The fabric switch of each of the switching nodes N1 to N18 may control a communication path such that communication between the switching nodes N1 to N18 is allowed.

Some or all of the switching nodes N1 to N18 may be allocated to the ports P1 to Pn to which the host or the storage devices are connected.

Figure 3A:
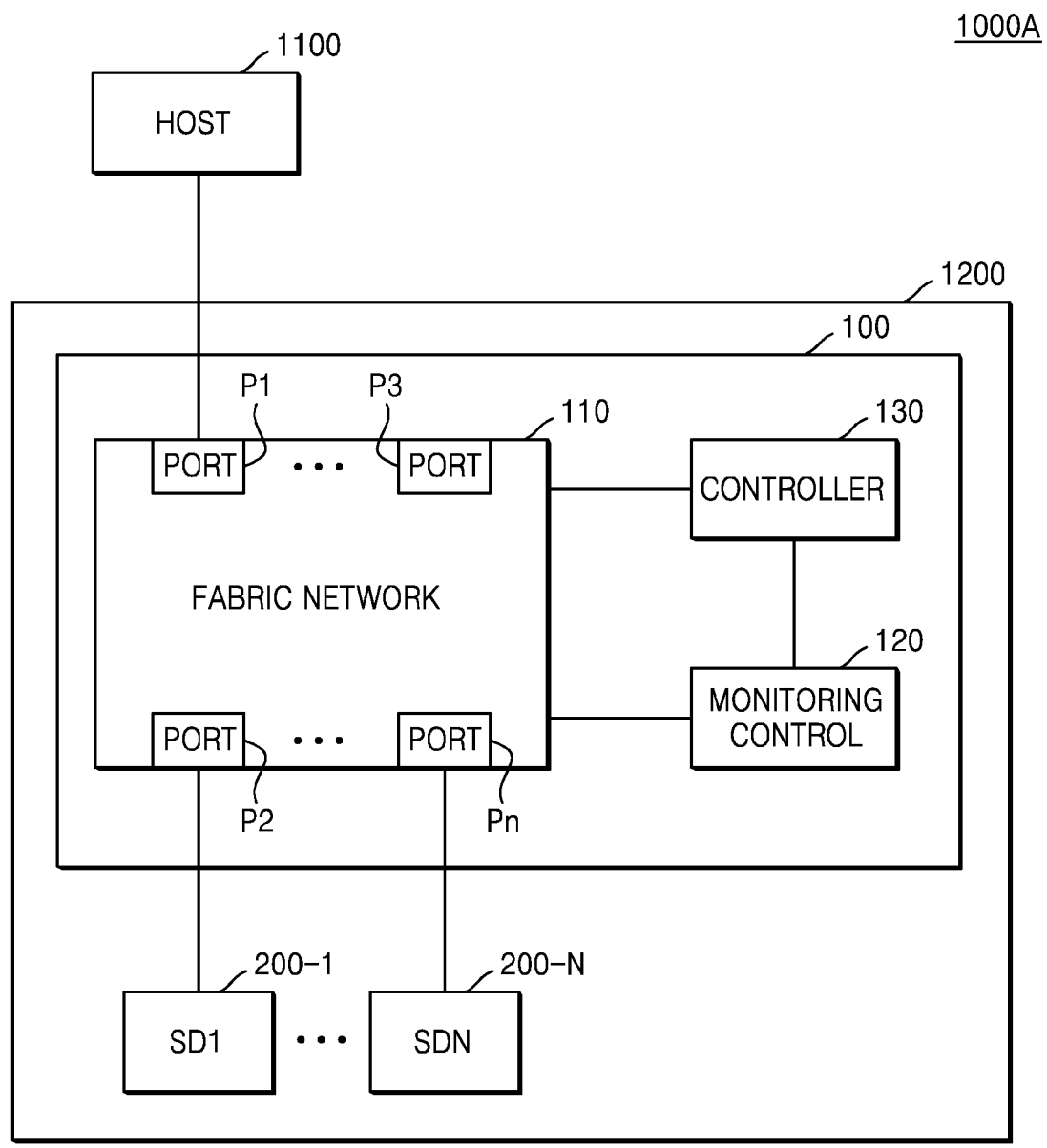
FIG. 3A is an example diagram of a computing system including a fabric network system according to an example embodiment of inventive concepts.

FIG. 3A is an example diagram of a computing system 1000A including a fabric network system according to an example embodiment of inventive concepts.

As shown in FIG. 3A, the computing system 1000A may include a host 1100 and a storage system 1200. The storage system 1200 may include the fabric network system 100 and a plurality of storage devices (shown as SD1 to SDN in FIG. 3A) 200-1 to 200-N (wherein N is an integer equal to two or more).

According to the example embodiment shown in FIG. 3A, the fabric network system 100 is included in the storage system 1200. As another example embodiment, the fabric network system 100 may be separated from the storage system 1200. As another example embodiment, the fabric network system 100 may be included in the host 1100. Since the fabric network system 100 is described above with reference to FIGS. 1 and 2, description of the fabric network system 100 will be omitted for convenience purposes.

The host 1100 may include hardware and/or hardware executing software that may communicate with the storage devices 200-1 to 200-N that access the fabric network system 100. Also, the host 1100 may include hardware and/or hardware executing software for performing various processing operations.

For example, the host 1100 may write data on the storage devices 200-1 to 200-N that access the fabric network system 100, or read data from the storage devices 200-1 to 200-N. Also, the host 1100 may perform various processing operations by using the data read from the storage devices 200-1 to 200-N.

For example, the host 1100 may transmit external interface bandwidth configuration information to the fabric network 110 during a process of setting up communications with the fabric network system 100.

Still referring to FIG. 3A, the storage devices 200-1 to 200-N may include hardware and/or hardware executing software that communicate with the host 1100 that access the fabric network system 100.

The storage devices 200-1 to 200-N may include hardware and/or hardware executing software for adjusting bandwidths of internal interfaces for communication with the fabric network system 100. The fabric network system 100 may adjust bandwidths of respective internal interfaces of the storage devices 200-1 to 200-N. That is, for example, the storage devices 200-1 to 200-N may receive an internal interface bandwidth adjustment request from the controller 130 of the fabric network system 100. Then, the storage devices 200-1 to 200-N may adjust the bandwidths of the internal interfaces of the storage devices 200-1 to 200-N based on the internal interface bandwidth adjustment request generated by the controller 130.

Each of the storage devices 200-1 to 200-N may be, but not limited to, at least one solid state drive (SSD), at least one hard disk drive (HDD), or at least one SSD and at least one HDD.

An interface that connects the host 1100 and the storage devices 200-1 to 200-N may include a Peripheral Component Interconnect Express (PCIe) interface, a Serial Attached Small Computer System Interface (SAS), a Serial Advanced Technology Attachment (SATA) interface, a network interface, or the like.

Figure 3B:
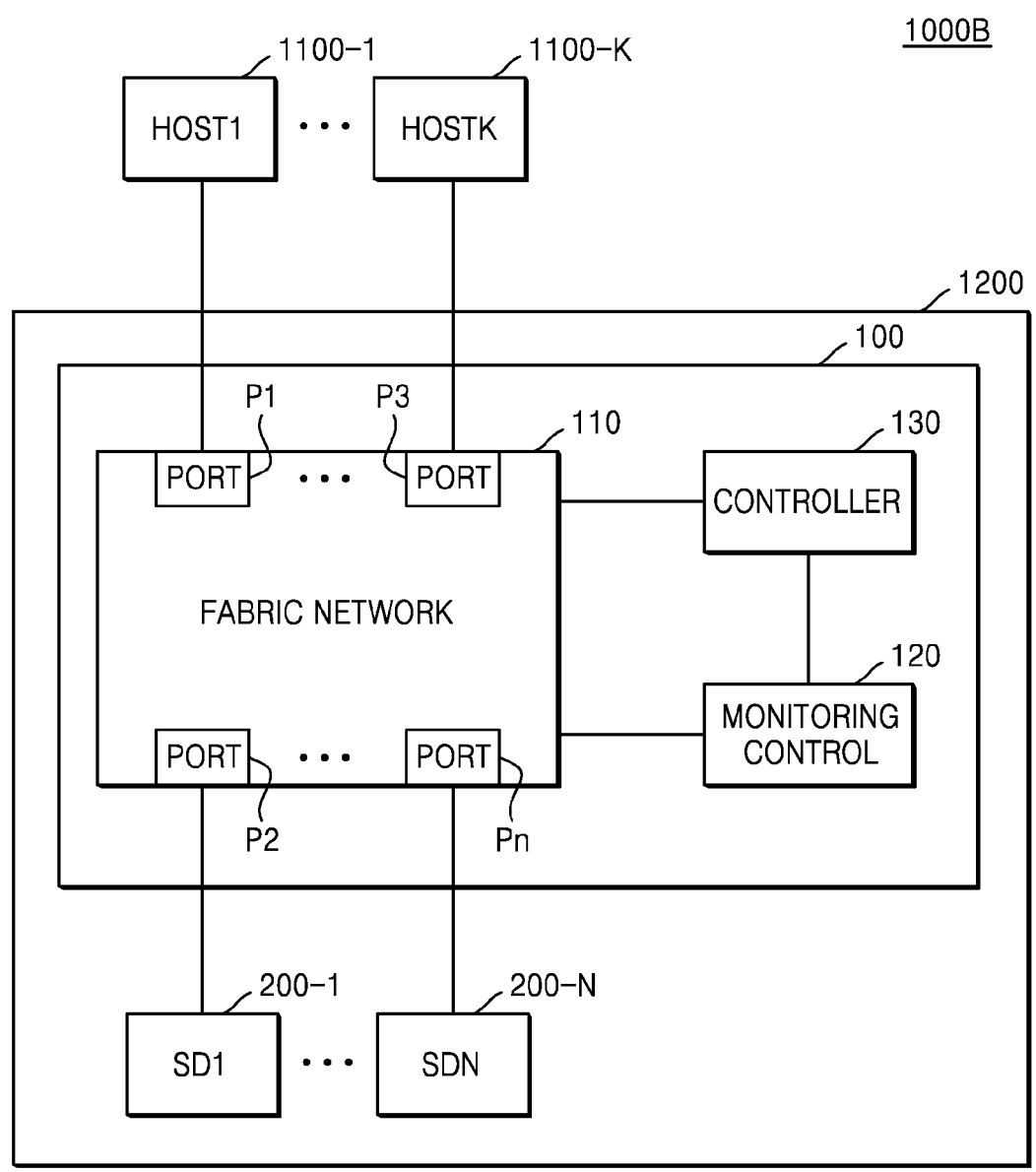
FIG. 3B is another example diagram of a computing system including a fabric network system, according to an example embodiment of inventive concepts.

FIG. 3B is another example diagram of a computing system 1000B including a fabric network system, according to an example embodiment of inventive concepts.

As shown in FIG. 3B, the computing system 1000B may include a plurality of hosts 1100-1 to 1100-K (wherein K is an integer equal to two or more), and a storage system 1200. The storage system 1200 includes the fabric network system 100 and the storage devices 200-1 to 200-N.

In the example embodiment shown in FIG. 3A, the one host 1100 is configured to access the fabric network system 100 in the computing system 1000A. In the example embodiment shown in FIG. 3B, the plurality of hosts 1100-1 to 1100-K are configured to access the fabric network system 100 in the computing system 1000B.

Each of the plurality of hosts 1100-1 to 1100-K may include hardware and/or hardware executing software that may communicate with the storage devices 200-1 to 200-N that access the fabric network system 100. Also, each of the plurality of hosts 1100-1 to 1100-K may include hardware and/or hardware executing software for performing various processing operations.

For example, each of the plurality of hosts 1100-1 to 1100-K may transmit external interface bandwidth configuration information to the fabric network 110 during a process of setting up communications with the fabric network system 100.

An interface that connects the plurality of hosts 1100-1 to 1100-K and the storage devices 200-1 to 200-N may include a PCIe interface, an SAS interface, a SATA interface, a network interface, or the like.

Figure 4:
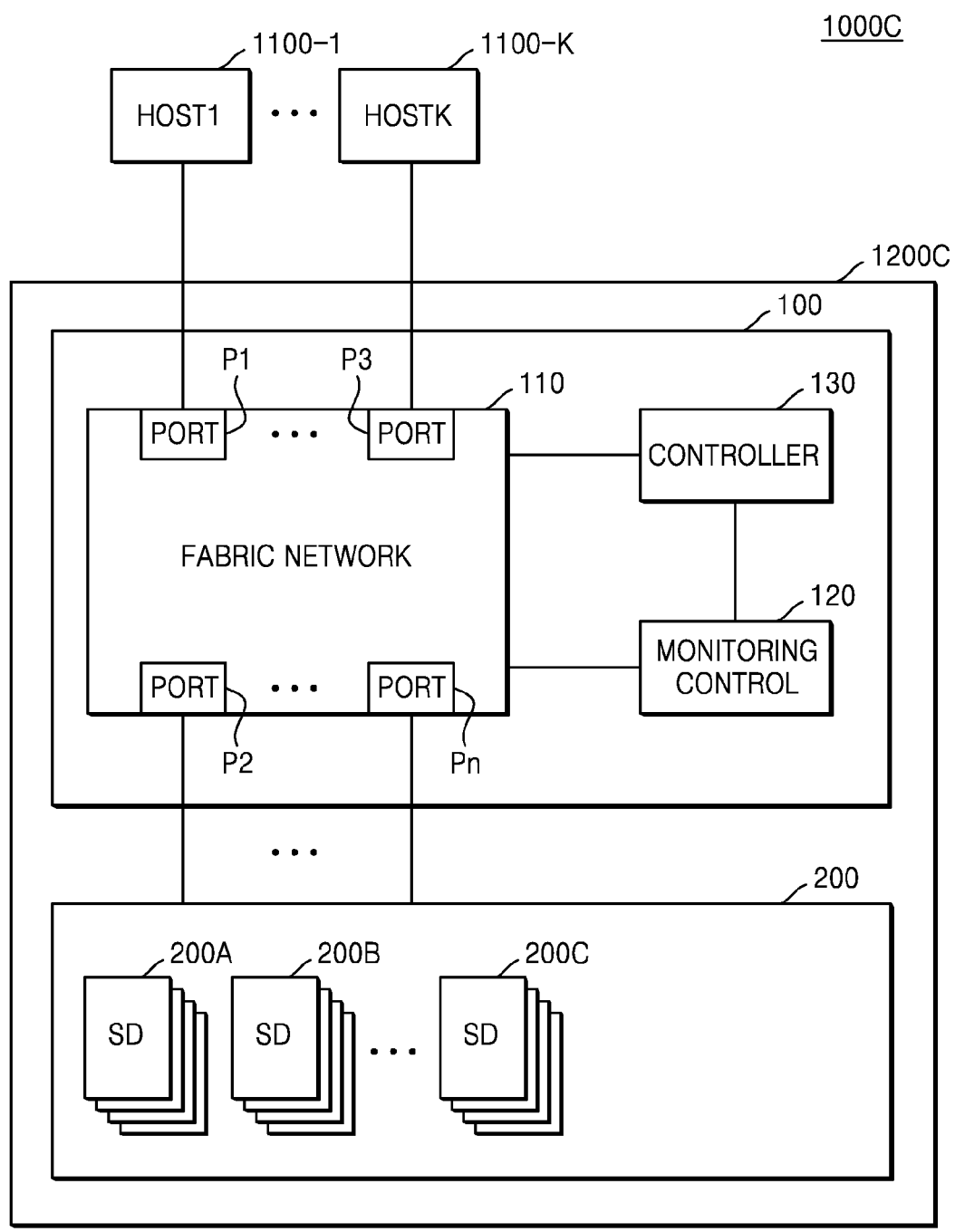
FIG. 4 is a diagram for describing a method of managing bandwidths of interfaces of storage devices according to groups in a computing system including a fabric network system, according to an example embodiment of inventive concepts.

FIG. 4 is an example diagram for describing a method of managing bandwidths of interfaces of storage devices according to groups in a computing system 1000C including a fabric network system, according to an example embodiment of inventive concepts.

As shown in FIG. 4, the computing system 1000C may include the plurality of hosts 1100-1 to 1100-K (wherein K is an integer equal to two or more), and a storage system 1200C. The storage system 1200C may include the fabric network system 100 and a storage device block 200.

The controller 130 of the fabric network system 100 may classify a plurality of storage devices in the storage device block 200 into groups according to bandwidths. For example, storage devices with a first bandwidth may be classified as storage devices 200A of a first group, storage devices with a second bandwidth may be classified as storage devices 200B of a second group, and storage devices with a third bandwidth may be classified as storage devices 200C of a third group.

Still referring to FIG. 4, the controller 130 of the fabric network system 100 may map a different group of storage devices, which are classified based on bandwidths, to each host of a plurality of hosts 1100-1 to 1100-K according to the bandwidths required by the plurality of hosts 1100-1 to 1100-K that access the fabric network 110. Also, the controller 130 may adjust bandwidths of the storage devices according to the bandwidth groups based on the status of an interface monitored by the monitoring control 120. For example, the controller 130 may adjust bandwidths of the interfaces by changing respective bandwidths groups of the storage devices.

The controller 130 and the monitoring control 120, as shown in FIGS. 1, 3A, 3B and 4 may be hardware, a firmware, a hardware executing software or any combination thereof. When at least one of the aforementioned components is hardware, such existing hardware may include one or more Central Processing Units (CPUs), digital signal processors (DSPs), application-specific-integrated-circuits (ASICs), advanced reduced instruction set computer machines (ARMs) processor, field programmable gate arrays (FPGAs) or the like configured as special purpose machines to perform the functions of the at least one of the aforementioned components. CPUs, DSPs, ASICs, ARMs and FPGAs may generally be referred to as processor and/or microprocessors.

Figure 5:
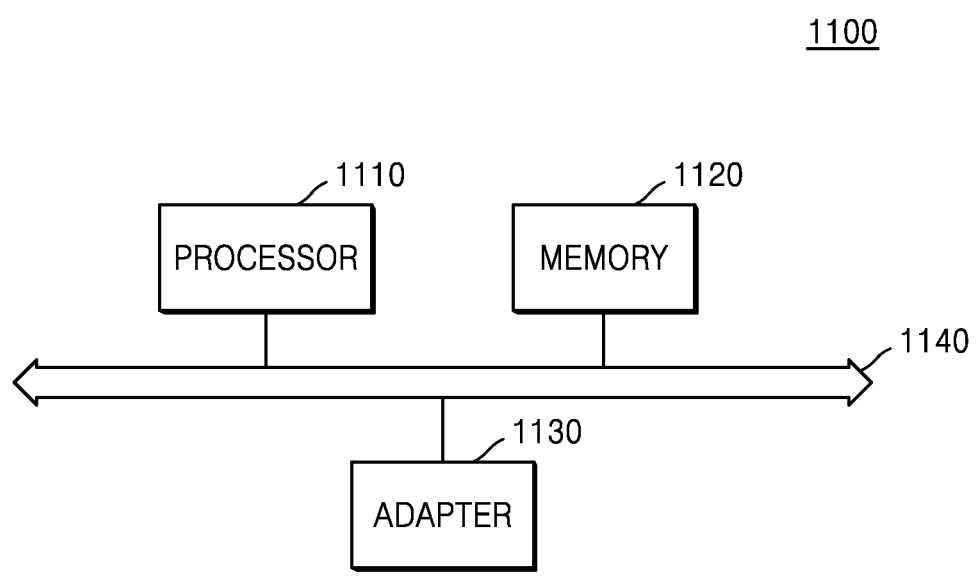
FIG. 5 is an example diagram of a host shown in FIG. 3A or 3B.

FIG. 5 is an example diagram of the host 1100 shown in FIG. 3A. It should be understood to one of ordinary skill in the art that the host 1100-1 shown in FIG. 3B may have the same structure.

As shown in FIG. 5, the host 1100 may include a processor 1110, a memory 1120, an adapter 1130, and a bus 1140.

The processor 1110, the memory 1120, and the adapter 1130 may access the bus 1140 and transmit and receive data or signals via the bus 1140.

The processor 1110 may include circuits, interfaces, and/or hardware executing program codes for processing data or controlling operations of components. For example, the processor 1110 may include one or more processors configured as special purpose machines to perform the functions of the at least one of the processor 1110.

The memory 1120 may include static random access memory (SRAM) or dynamic random access memory (DRAM) that stores data, commands, and/or program codes for operations of the host 1100 or one of the plurality of hosts 1100-1. Also, in an example embodiment, the memory 1120 may include non-volatile memory. The memory 1120 may store program codes for executing at least one operating system and virtual machines, and may also store program codes for executing a hypervisor for managing the virtual machines.

Still referring to FIG. 5, the processor 1110 using the memory 1120 may execute the at least one operating system and the virtual machines. Also, the processor 1110 may execute the hypervisor for managing the virtual machines, or be controlled by the hypervisor.

The processor 1110 may execute a software switch in the hypervisor to provide network accessibility between the virtual machines or accessibility between the storage devices 200-1 to 200-N via the virtual machines and the fabric network system 100.

The processor 1110 may transmit an interface bandwidth configuration to the fabric network 110 during a process of setting up communications with the fabric network system 100.

The adapter 1130 may connect the fabric network system 100 to the host 1100 or one of the plurality of hosts 1100-1. For example, the adapter 1130 may be a host bus adapter (HBA) or network adapter. For example, the HBA may include a Small Computer System Interface (SCSI) adapter, a fiber channel adapter, a SATA adapter, or the like. The network adapter may be connected to network devices via links. For example, links may include copper wiring, fiber optic cabling, at least one wireless channels, or a combination thereof. Also, the network adapter may include circuits, interfaces, and/or hardware executing codes for transmitting or receiving data according to at least one network standards.

For example, the adapter 1130 may include a PCIe interface, an SAS interface, a SATA interface, a network interface, or the like, as an interface for connecting the storage devices 200-1 to 200-N via the fabric network system 100.

Figure 6:
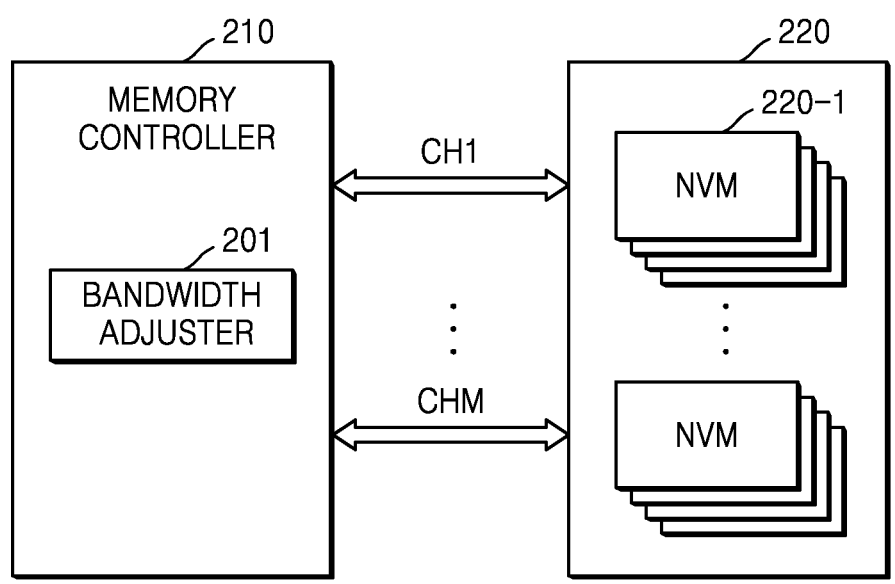
FIG. 6 is an example diagram of a storage device shown in FIG. 3A or 3B.

FIG. 6 is an example diagram of the storage device 200-1 shown in FIGS. 3A and 3B.

As shown in FIG. 6, the storage device 200-1 may include a memory controller 210 and a memory device 220.

The memory device 220 may include at least one non-volatile memory (shown as NVM in FIG. 6) 220-1. For example, the non-volatile memory 220-1 applied to the memory device 220 may not only be provided as flash memory, but also phase change random access memory (PRAM), ferroelectric RAM (FRAM), magnetic RAM (MRAM), or the like. As another example embodiment, the memory device 220 may be provided as a combination of at least one non-volatile memory device and at least one volatile memory device, or provided as a combination of at least two types of non-volatile memory devices.

The memory controller 210 may control the memory device 220 based on commands received from a host. The memory controller 210 may control programming (or writing), reading, or erasing of the memory device 220 that is connected via a plurality of channels CH1 to CHM based on the commands received from the host.

Between the memory controller 210 and the memory device 220, channels are provided for inputting and outputting signals for performing operations. The signals for performing operations may include, for example, commands, addresses, and data.

The memory controller 210 may include bandwidth adjuster 201. The bandwidth adjuster 201 may include hardware and/or hardware executing software for adjusting interface processing speed of the fabric network system 100. When the memory controller 210 receives an internal interface adjustment request from the fabric network system 100, the memory controller 210 may adjust bandwidth of an interface of a storage device based on the request. The interface processing speed and power consumption may increase by increasing the bandwidth of the interface of the storage device. Alternatively, the interface processing speed and power consumption may decrease by decreasing the bandwidth of the interface of the storage device.

Figure 7:
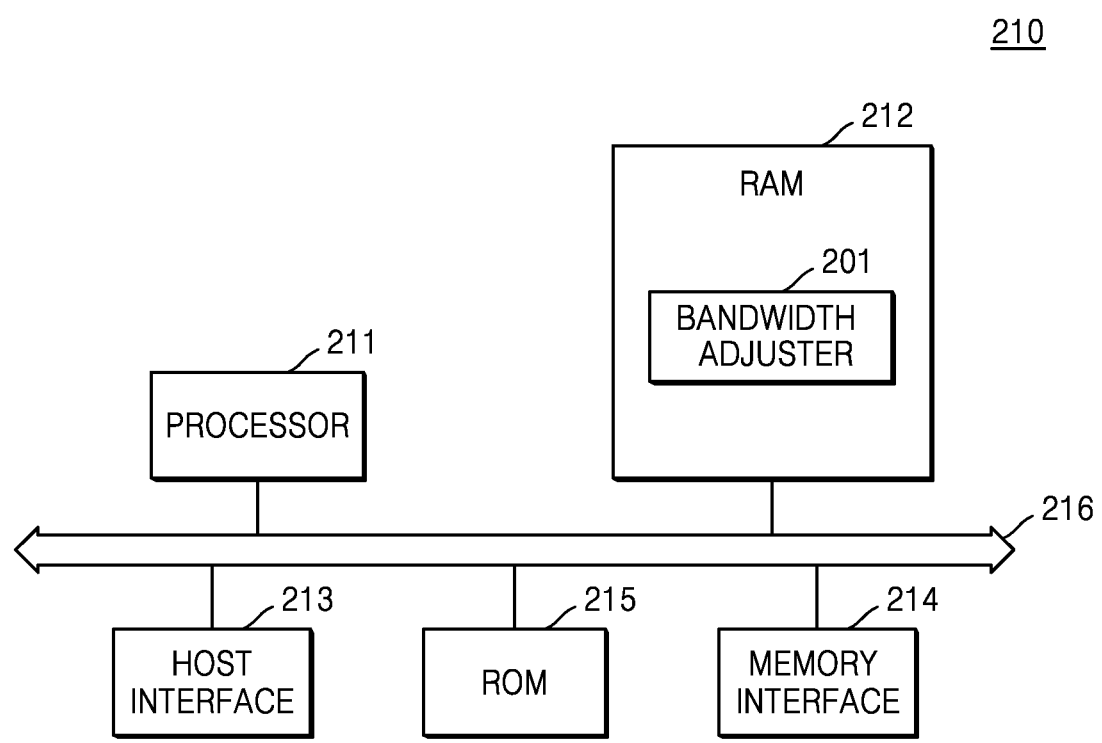
FIG. 7 is an example diagram of a memory controller of FIG. 6.

FIG. 7 is an example diagram of the memory controller 210 of FIG. 6.

As shown in FIG. 7, the memory controller 210 may include a processor 211, RAM 212, a host interface 213, a memory interface 214, read-only memory (ROM) 215, and a bus 216.

Components of the memory controller 210 transmit and receive data and signals via the bus 216.

The processor 211 may control overall operations of the storage device 200-1 by using program codes and data stored in the RAM 212. When the storage device 200-1 is reset, the processor 211 may read the program codes and the data required for controlling operations performed by the storage device 200-1 in the memory device 220, and load the program codes and the data on the RAM 212. The RAM 212 may load hardware executing software for the bandwidth adjuster 201.

The host interface 213 may have a protocol for exchanging data with a host that accesses the memory controller 210, and function as an interface between the memory controller 210 and the host. The host interface 213 may be provided as, for example, an Advanced Technology Attachment (ATA) interface, a SATA interface, a Parallel Advanced Technology Attachment (PATA) interface, a Universal Serial Bus (USB), an SAS interface, a SCSI, an embedded Multi Media Card (eMMC) interface, a Universal Flash Storage (UFS) interface, a Peripheral Component Interconnect (PCI) interface, a PCIe interface, a network interface, or the like. However, the aforementioned interfaces are merely example, and the host interface 213 is not limited thereto. The host interface 213 may be controlled by the processor 211 and receive commands and data from the host or transmit data to the host.

The memory interface 214 may be electrically connected to the memory device 220. The memory interface 214 may be controlled by the processor 211, and may transmit commands, addresses, and data to the memory device 220 or receive data from the memory device 220. The memory interface 214 may be configured to support NAND flash memory or NOR flash memory. The memory interface 214 may be configured to perform hardware executing software or hardware interleaving operations via a plurality of channels.

The ROM 215 may store code information for initial booting of an apparatus accessed by a storage device.

Figure 8:
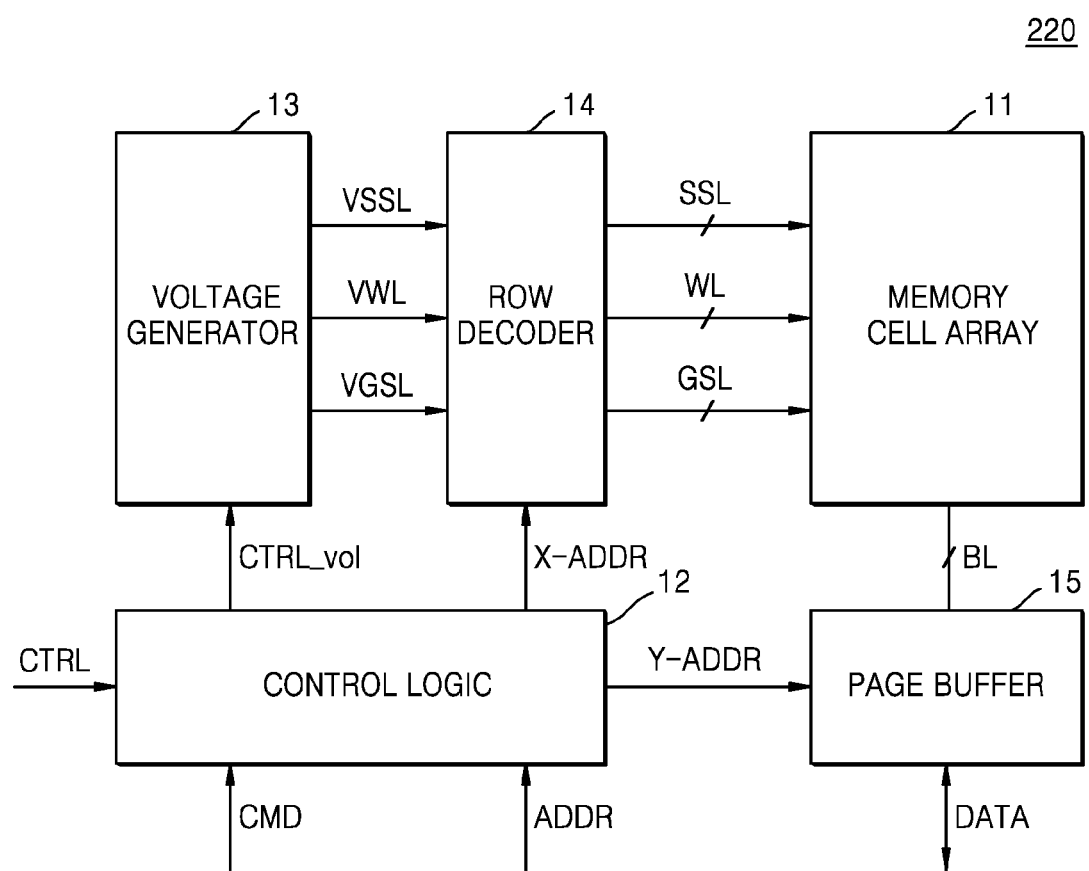
FIG. 8 is a detailed diagram of an example of a memory device of FIG. 6.

FIG. 8 is a detailed diagram of an example embodiment of the memory device 220 of FIG. 6.

Referring to FIG. 8, the memory device 220 may include a memory cell array 11, a control logic 12, a voltage generator 13, a row decoder 14, and a page buffer 15. Hereinafter, the aforementioned components in the memory device 220 will be described.

The memory cell array 11 may be connected to at least one string selection line SSL, a plurality of word lines WL, at least one ground selection line GSL, and a plurality of bit lines BL. The memory cell array 11 may include a plurality of memory cells in areas where the word lines WL intersect the bit lines BL.

When an erase voltage is applied to the memory cell array 11, the memory cells are in an erase state, and when a program voltage is applied to the memory cell array 11, the memory cells are in a program state. Each of the memory cells may have one of an erase state and first to n-th program states, which are distinguished according to threshold voltages.

In an example embodiment, 'n' may be a natural number equal to two or more. For example, when the memory cells are 2-bit level cells, 'n' may be equal to 3. As another example, when the memory cells are 3-bit level cells, 'n' may be equal to 7. As another example, when the memory cells are 4-bit level cells, 'n' may be equal to 15. Accordingly, the memory cells may include multi-level cells. However, example embodiments of inventive concepts are not limited thereto, and the memory cells may include single level cells.

Based on a command CMD, an address ADDR, and a control signal CTRL received from a memory controller 210, the control logic 12 may output various control signals for writing data on the memory cell array 11 or reading data from the memory cell array 11. Accordingly, the control logic 12 may control overall operations of the memory device 220.

The various control signals output from the control logic 12 may be provided to the voltage generator 13, the row decoder 14, and the page buffer 15. In particular, the control logic 12 may provide a voltage control signal CTRL_vol to the voltage generator 13, a row address X_ADDR to the row decoder 14, and a column address Y_ADDR to the page buffer 15.

Based on the voltage control signal CTRL_vol, the voltage generator 13 may generate various types of voltages for performing programming, reading, and erasing on the memory cell array 11. In particular, the voltage generator 13 may generate a first driving voltage VWL for driving the word lines WL, a second driving voltage VSSL for driving the string selection lines SSL, and a third driving voltage VGSL for driving the ground selection lines GSL.

The first driving voltage VWL may be a program voltage (or a write voltage), a read voltage, an erase voltage, a pass voltage, or a program verification voltage. Also, the second driving voltage VSSL may be a string selection voltage, i.e., an on voltage or an off voltage. Furthermore, the third driving voltage VGSL may be a ground selection voltage, i.e., an on voltage or an off voltage.

The row decoder 14 may be connected to the memory cell array 11 via the word lines WL, and activate some of the word lines WL in response to the row address X_ADDR received from the control logic 12. In particular, when performing a read operation, the row decoder 14 may apply a read voltage to a selected word line and apply a pass voltage to a non-selected word line.

When performing a program operation, the row decoder 14 may apply a program voltage to a selected word line and apply a pass voltage to a non-selected word line. According to an example embodiment, during one or more program loops, the row decoder 14 may apply a program voltage to a selected word line and an additionally selected word line.

The page buffer 15 may be connected to the memory cell array 11 via the bit lines BL. For example, during a read operation, the page buffer 15 may function as a sense amplifier and output DATA stored in the memory cell array 11. Also, during a program operation, the page buffer 15 may function as a write driver and input DATA to be stored in the memory cell array 11.

Figure 9:
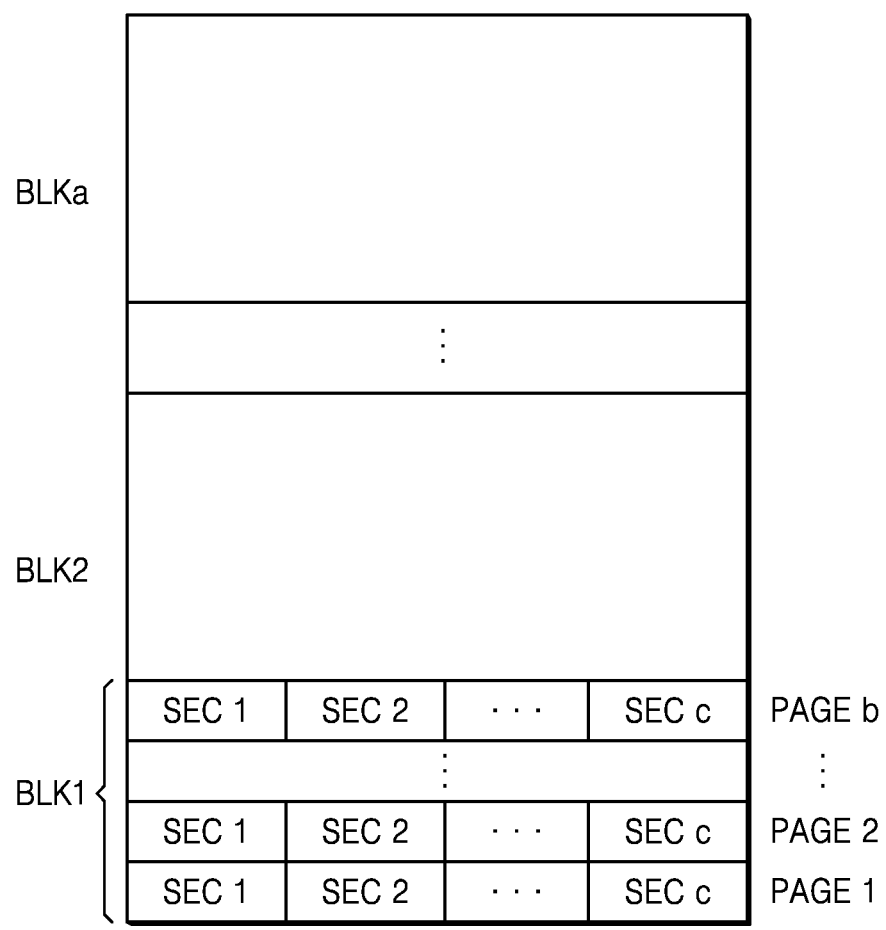
FIG. 9 is an example of a memory cell array of FIG. 8.

FIG. 9 is an example embodiment of the memory cell array 11 of FIG. 8.

Referring to FIG. 9, the memory cell array 11 may be a flash memory cell array. The memory cell array 11 may include memory blocks BLK1 to BLKa (wherein 'a' is an integer equal to two or more). Each of the memory blocks BLK1 to BLKa may include pages PAGE to PAGEb (wherein 'b' in an integer equal to two or more). Each of the pages PAGE1 to PAGEb may include sectors SEC1 to SECc (wherein 'c' is an integer equal to two or more). In FIG. 9, for convenience of description, the pages PAGE1 to PAGEb and the sectors SEC1 to SECc are only shown in the memory block BLK1. However, the memory blocks BLK2 to BLKa may also have the same structure as the memory block BLK1.

Figure 10:
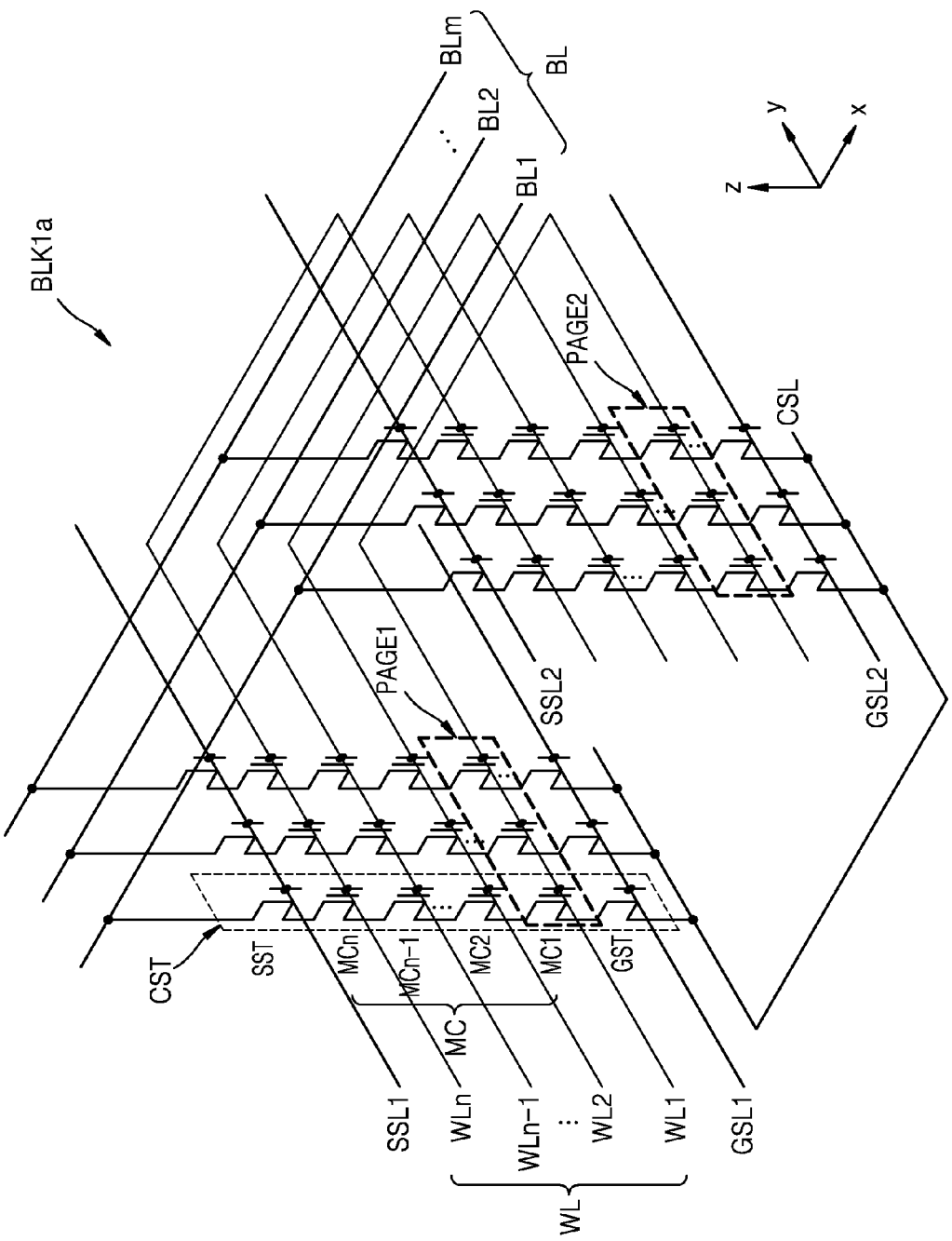
FIG. 10 is a circuit diagram of an example of a first memory block included in the memory cell array of FIG. 9.

FIG. 10 is a circuit diagram of an example embodiment of a first memory block BLK1a included in the memory cell array 11 of FIG. 9.

Referring to FIG. 10, the first memory block BLK1a may be a NAND flash memory with a vertical structure. In an example embodiment, the memory blocks BLK1 to BLKa of FIG. 9 may have the same structure as the first memory block BLK1a of FIG. 10. In FIG. 10, a first direction is referred to as an x-axis direction, a second direction is referred to as a y-axis direction, and a third direction is referred to as a z-axis direction. However, example embodiments are not limited thereto, and the first to third directions may be changed.

The first memory block BLK1a may include a plurality of cell strings CST, a plurality of word lines WL, a plurality of bit lines BL, a plurality of ground selection lines GSL1 and GSL2, first and second string selection lines SSL1 and SSL2, and a common source line CSL. The number of the cell strings CST, the number of the word lines WL, the number of the bit lines BL, the number of the ground selection lines GSL1 and GSL2, and the number of the first and second string selection lines SSL1 and SSL2 may be variously modified.

Each of the cell strings CST may include a string selection transistor SST, a plurality of memory cells MC and a ground selection transistor GST connected in series between the bit line BL and the common source line CSL. However, the cell strings CST are not limited thereto. According to another example embodiment, each of the cell strings CST may further include at least one dummy cell. According to another example embodiment, each of the cell strings CST may include at least two string selection transistors or at least two ground selection transistors.

Also, the cell strings CST may extend in the third direction (the z-axis direction), and may extend in a vertical direction (the z-axis direction) on a substrate. Accordingly, the first memory block BLK1a that includes the cell strings CST may be referred to as NAND flash memory in the vertical direction. By extending the cell strings CST in the vertical direction (the z-axis direction) on the substrate, a degree of integration of the memory cell array 11 may be improved.

The word lines WL may extend in the first direction (the x-axis direction) and the second direction (the y-axis direction). Each of the word lines WL may be connected to a corresponding memory cell from among the memory cells MC. Accordingly, from among the memory cells MC, memory cells that are adjacently arranged on an identical layer in the first direction (the x-axis direction) and the second direction (the y-axis direction) may be connected an identical word line from among the word lines WL. In particular, each of the word lines WL may be connected to a gate of each of the memory cells MC and control the connected memory cell MC. The memory cells MC may store data, and the data may be read, or erased under the control of the connected word line WL.

The bit lines BL may extend in the first direction (the x-axis direction) and be connected to the string selection transistor SST. Accordingly, a plurality of string selection transistors SST adjacently arranged in the first direction (the x-axis direction) may be connected to an identical bit line BL. In particular, each of the bit lines BL may be connected to a drain of the string selection transistor SST.

The first and second string selection lines SSL1 and SSL2 may extend in the second direction (the y-axis direction), and be connected to the string selection transistor SST. Accordingly, the string selection transistors SST adjacently arranged in the second direction (the y-axis direction) may be connected to an identical string selection line (SSL1 or SSL2). In particular, each of the first and second string selection lines SSL1 and SSL2 may be connected to a gate of the string selection transistor SST and control the string selection transistor SST.

The ground selection lines GSL1 and GSL2 may extend in the second direction (the y-axis direction), and be connected to the ground selection transistor GST. Accordingly, a plurality of ground selection transistors GST adjacently arranged in the second direction (the y-axis direction) may be connected to an identical ground selection line (GSL1 or GSL2). In particular, each of the ground selection line GSL1 and GSL2 may be connected to a gate of the ground selection transistor GST and control the ground selection transistor GST.

Also, the ground selection transistors GST included in the cell strings CST may be commonly connected to the common source line CSL. In particular, the common source line CSL may be connected to a source of the ground selection transistor GST.

In an example embodiment, the memory cells MC, which are commonly connected to an identical word line WL and an identical string selection line (SSL1 or SSL2) and adjacently arranged in the second direction (the y-axis direction), may be referred to as a page. For example, the memory cells MC, which are commonly connected to a first word line WL1 and a first string selection line SSL1 and adjacently arranged in the second direction (the y-axis direction), may be referred to as a first page PAGE1. Also, the memory cells MC, which are commonly connected to the first word line WL1 and the second string selection line SSL2 and adjacently arranged in the second direction (the y-axis direction) may be referred to as a second page PAGE2.

In order to perform a program operation on the memory cells MC, 0V may be applied to the bit lines BL, an ON voltage may be applied to the string selection line SSL and an OFF voltage may be applied to the ground selection line GSL. The ON voltage may be equal to or greater than a threshold voltage to turn on the string selection transistor SST, and the OFF voltage may be smaller than a threshold voltage to turn off the ground selection transistors GST. Also, a program voltage may be applied to a memory cell selected from among the memory cells MC and a pass voltage may be applied to the remaining memory cells. When the program voltage is applied, charge may be injected into the memory cells MC by F-N tunneling. The pass voltage may be greater than a threshold voltage of the memory cells MC.

In order to perform an erase operation on the memory cells MC, an erase voltage may be applied to a body of the memory cells MC and 0V may be applied to the word lines WL. Accordingly, data of the memory cells MC may be simultaneously erased.

Figure 11:
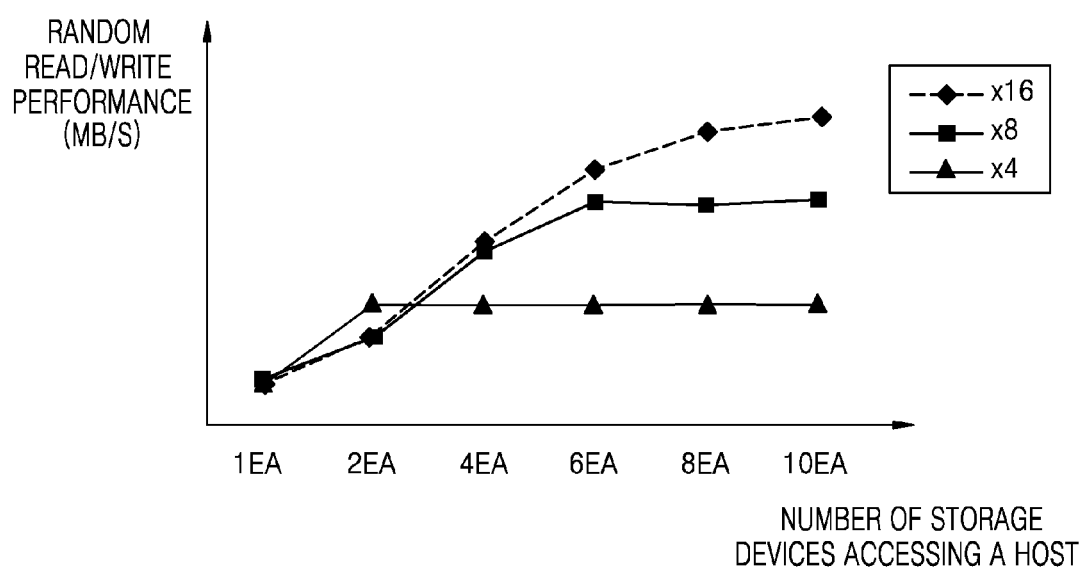
FIG. 11 is a graph of performance of a computing system including a fabric network system according to the number of storage devices that access a host, according to an example embodiment of inventive concepts.

FIG. 11 is a graph of performance of the computing systems 1000A, 1000B, or 1000C including the fabric network system 100 according to the number of storage devices that access a host, according to an example embodiment of inventive concepts.

FIG. 11 shows a result obtained by measuring random read performance (MB/S) by increasing the number of storage devices that access a host while bandwidths of interfaces of the storage devices are fixed.

Referring to FIG. 11, a line with triangles indicates an example of four interface lanes of a storage system, a line with squares indicates an example of eight interface lanes of a storage system, and a line with diamonds indicates an example of sixteen interface lanes of a storage system.

When there are four interface lanes, the random read performance increases until the number of storage devices is equal to two, but does not increase when more than two storage devices are accessed.

Also, when there are eight interface lanes, the random read performance increases until the number of storage devices is equal to six, but almost does not increase when more than six storage devices are accessed.

Also, when there are sixteen interface lanes, the random read performance increases until the number of storage devices is equal to eight, but does not significantly increase when more than eight storage devices are accessed.

Based on the result shown in FIG. 11, extra bandwidth is generated in storage devices 200-1 to 200-N that have been added after the random read performance and the random read performance is not affected even when the extra bandwidth is reduced.

Therefore, according to an example embodiment of inventive concepts, the bandwidths of internal interfaces are adjusted to reduce power consumption of a storage system so that the extra bandwidth generated in the storage devices 200-1 to 200-N that have been added after the random read performance of the fabric network system 100 is reduced.

Based on the result shown in FIG. 11, the controller 130 of the fabric network system 100 may adjust the bandwidths of interfaces of the storage devices 200-1 to 200-N based on status of an external interface connected to a host and status of internal interfaces connected to the storage devices 200-1 to 200-N.

For example, the controller 130 of the fabric network system 100 may calculate aggregate information of bandwidths of internal interfaces of the storage devices connected to the host. The controller 130 may also adjust the bandwidths of the internal interfaces such that the calculated aggregate information of the bandwidths of the internal interfaces is within a threshold range based on the bandwidth of the external interface connected to the host. In an example embodiment, the threshold range may be determined based on estimation results such as the result shown in the FIG. 11. For example, based on the result shown in the FIG. 11, a minimum bandwidth of a threshold range may be determined by a total sum of bandwidths of eight storage devices. Also, a maximum bandwidth of a threshold range may be determined by sum of a total sum of bandwidths of eight storage devices and desired margin (that may or may not be predetermined.)

For example, the controller 130 may map and connect storage devices 200-1 to 200-N in an identical bandwidth group to the host, and adjust bandwidths of the storage devices 200-1 to 200-N for each bandwidth group such that the calculated aggregate information of the bandwidths of the internal interfaces is within the threshold range based on the bandwidth of the external interface connected to the host.

As another example embodiment, the controller 130 may independently adjust the respective bandwidths of the storage devices 200-1 to 200-N such that the calculated aggregate information of the bandwidths of the internal interfaces is within the threshold range based on the bandwidth of the external interface connected to the host.

Figure 12:
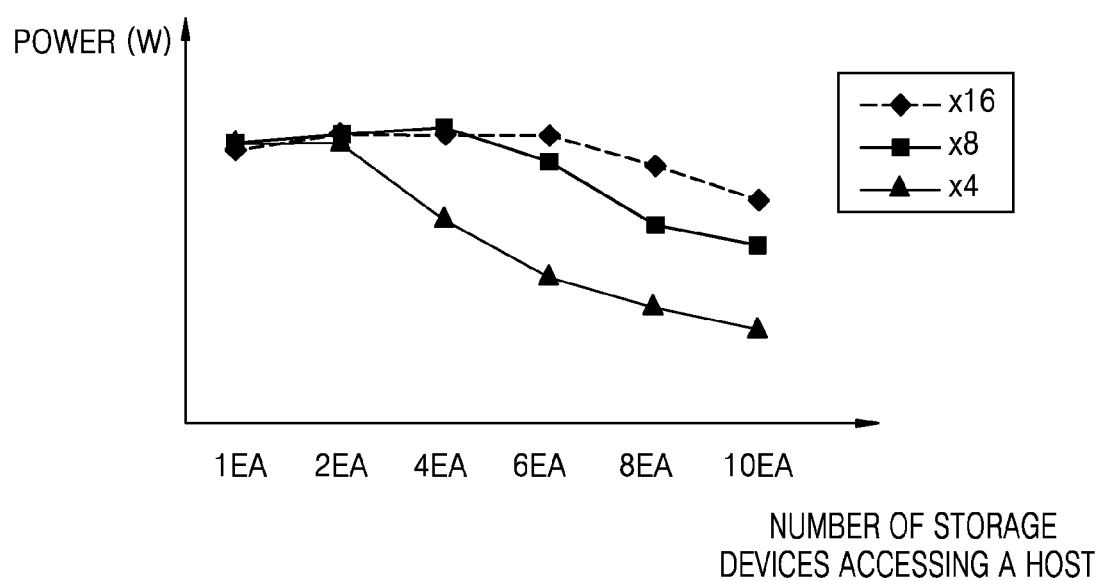
FIG. 12 is a graph of power consumption of one storage device in a computing system including a fabric network system according to the number of storage devices that access a host, according to an example embodiment of inventive concepts.

FIG. 12 is a graph of power consumption of one storage device in the computing systems 1000A, 1000B, or 1000C including the fabric network system 100 according to the number of storage devices that access a host, according to an example embodiment of inventive concepts.

FIG. 12 shows a result obtained by measuring power consumption of a storage device according to the number of storage devices 200-1 to 200-N that access the host while the bandwidths of the internal interfaces of the storage devices 200-1 to 200-N are adjusted by the fabric network system 100.

Referring to FIG. 12, power consumption per storage device may decrease by adjusting the bandwidths such that extra bandwidth generated due to an increase of storage devices after the performance.

Figure 13:
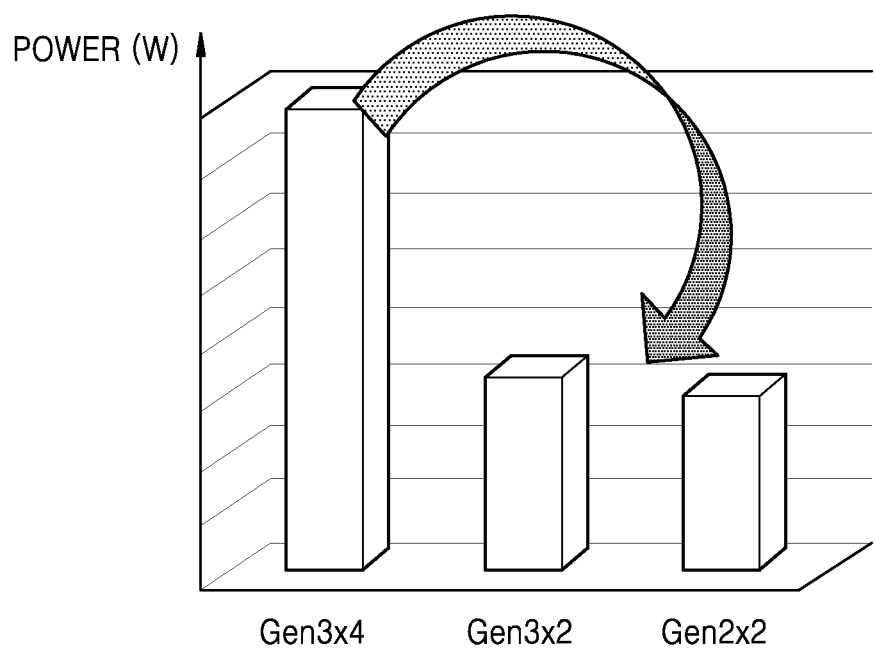
FIG. 13 is a graph of idle power consumption of a computing system including a fabric network system according to bandwidths of interfaces, according to an example embodiment of inventive concepts.

FIG. 13 is a graph of idle power consumption of the computing systems 1000A, 1000B, or 1000C including the fabric network system 100 according to bandwidths of interfaces, according to an example embodiment of inventive concepts.

FIG. 13 shows idle power consumption of a storage device when interface specification is reduced from PCIe Gen3x4 to PCIe Gen3x2 or PCIe Gen2x2. Referring to FIG. 13, the idle power consumption of the storage device decreases when the bandwidths of the interfaces are reduced.

Figure 14:
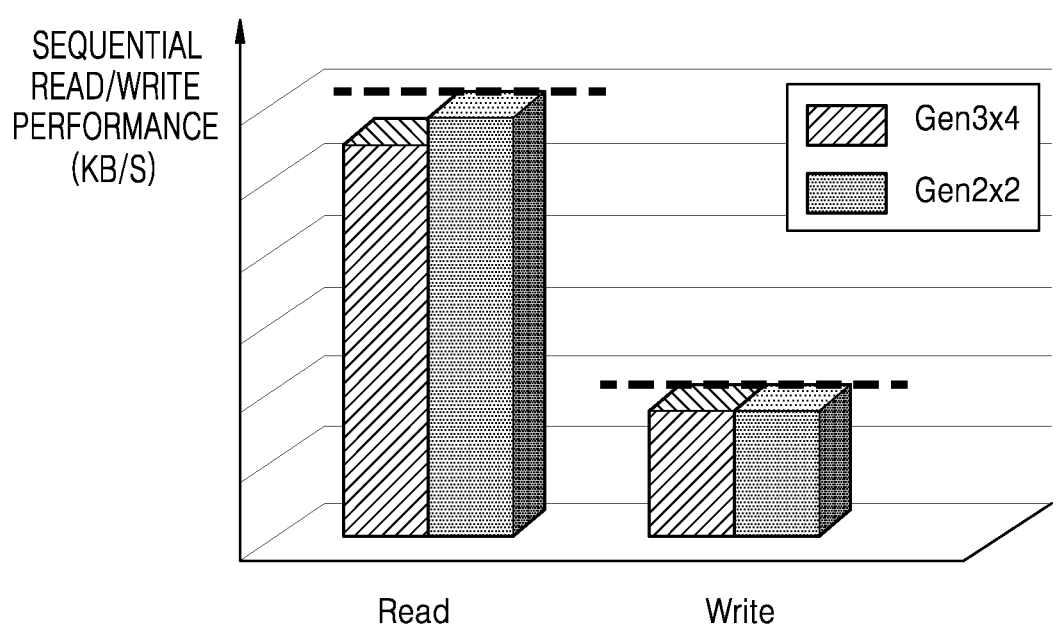
FIG. 14 is a graph of a sequential read/write performance of a computing system including a fabric network system according to bandwidths of interfaces, according to an example embodiment of inventive concepts.

FIG. 14 is a graph of sequential read/write performance of the computing systems 1000A, 1000B, or 1000C including the fabric network system 100 according to bandwidths of interfaces, according to an example embodiment of inventive concepts.

Figure 15:
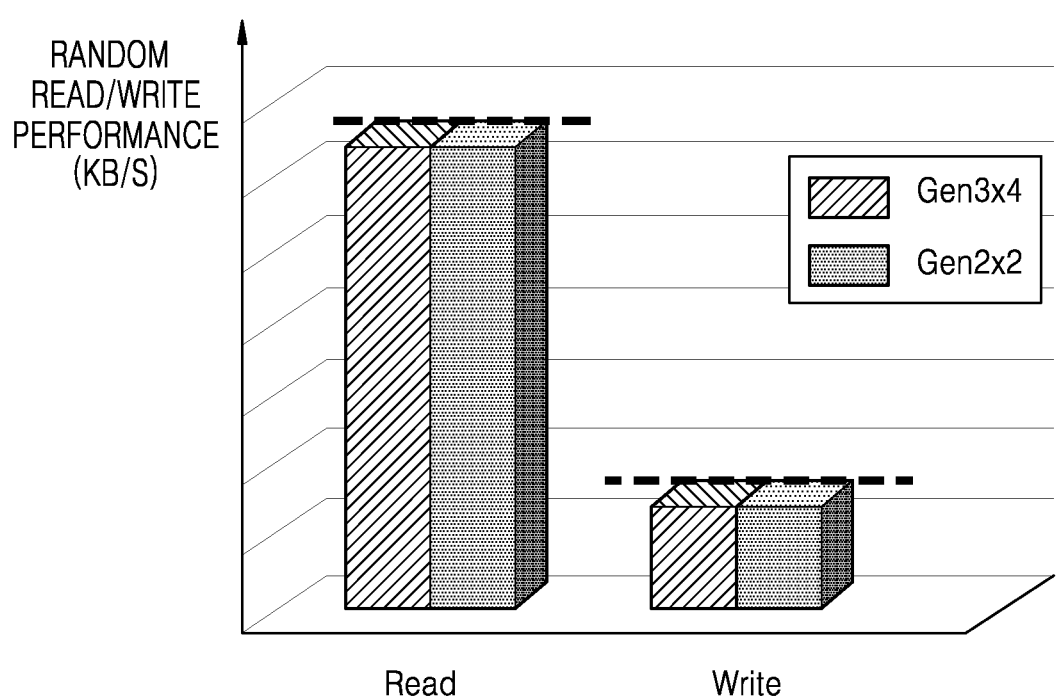
FIG. 15 is a graph of a random read/write performance of a computing system including a fabric network system according to bandwidths of interfaces, according to an example embodiment of inventive concepts.

FIG. 15 is a graph of random read/write performance of the computing systems 1000A, 1000B, or 1000C including the fabric network system 100 according to bandwidths of interfaces, according to an example embodiment of inventive concepts.

FIGS. 14 and 15 show sequential read/write performance and random read/write performance when interface specification is Gen3x4 or Gen2x2 in a state when bandwidths of internal interfaces of storage devices are adjusted by the fabric network system 100.

Referring to FIGS. 14 and 15, when bandwidth of an external interface connected to a host shows performance, it is possible to maintain a similar level of performance even when the bandwidths of the internal interfaces connected to the storage devices are reduced.

Figure 16:
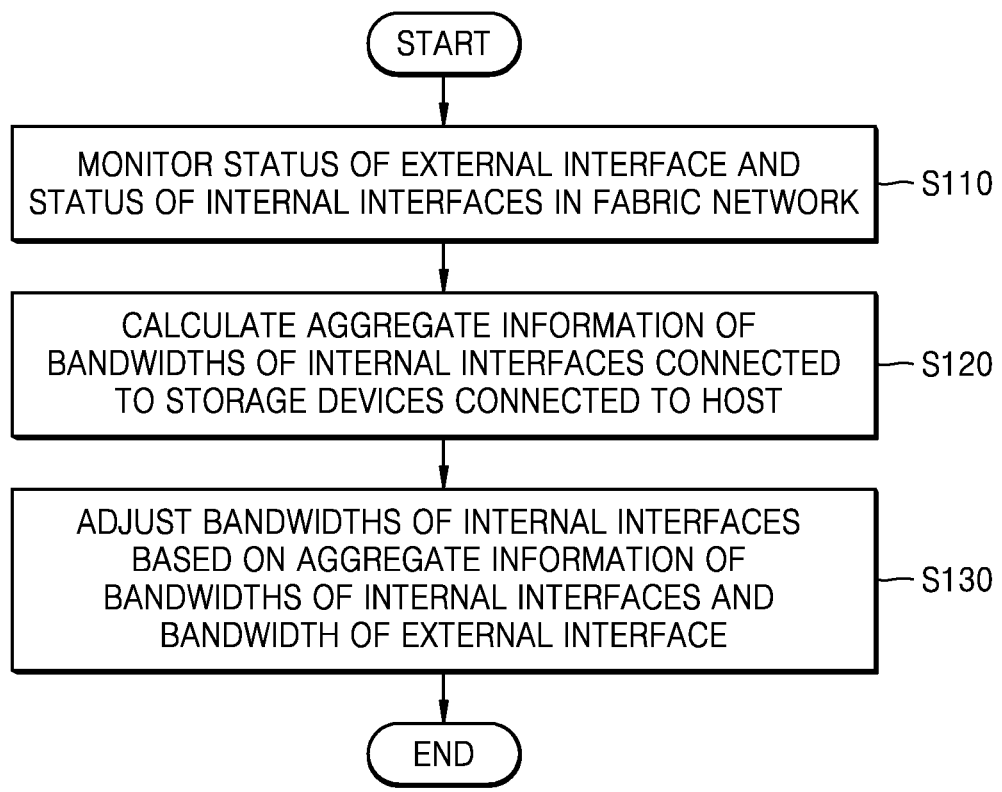
FIG. 16 is an example of a flowchart of a power management method using a fabric network, according to an example embodiment of inventive concepts.

FIG. 16 is an example of a flowchart of a power management method using a fabric network, according to an example embodiment of inventive concepts.

An example of a power management method performed by the computing systems 1000A, 1000B, or 1000C including the fabric network system 100 of FIG. 1 by adjusting bandwidth of an internal interface will be described with reference to the flowchart of FIG. 16.

Referring to FIG. 16, at S110 the fabric network system 100 may monitor status of an external interface connected to a host and status of internal interfaces connected to storage devices in a fabric network. For example, the monitoring control 120 of the fabric network system 100 may monitor bandwidths of the external interface and the internal interface based on the external interface bandwidth configuration received from the host, and the internal interface bandwidth configuration received from the storage devices.

Next, at S120 the fabric network system 100 may calculate aggregate information of the bandwidths of the internal interfaces of the storage devices connected to the host. For example, the controller 130 of the fabric network system 100 may calculate the aggregate information of the bandwidths of the internal interfaces of the storage devices connected to the host based on a monitoring result of the bandwidths of the external interface and the internal interfaces.

Next, at S130 the fabric network system 100 may adjust the bandwidths of the internal interfaces based on the aggregate information of the bandwidths of the internal interfaces and the bandwidth of the external interface. For example, the controller 130 of the fabric network system 100 may adjust the bandwidths of the internal interfaces such that the aggregated information of the bandwidths of the internal interfaces calculated according to hosts is within a threshold range based on the bandwidth of the external interface connected to each of the hosts. The threshold range may be determined by simulations or experiments such that the I/O performance according to the bandwidth of the external interface of the host is maintained and power consumption of storage devices connected to the host is reduced.

Figure 17:
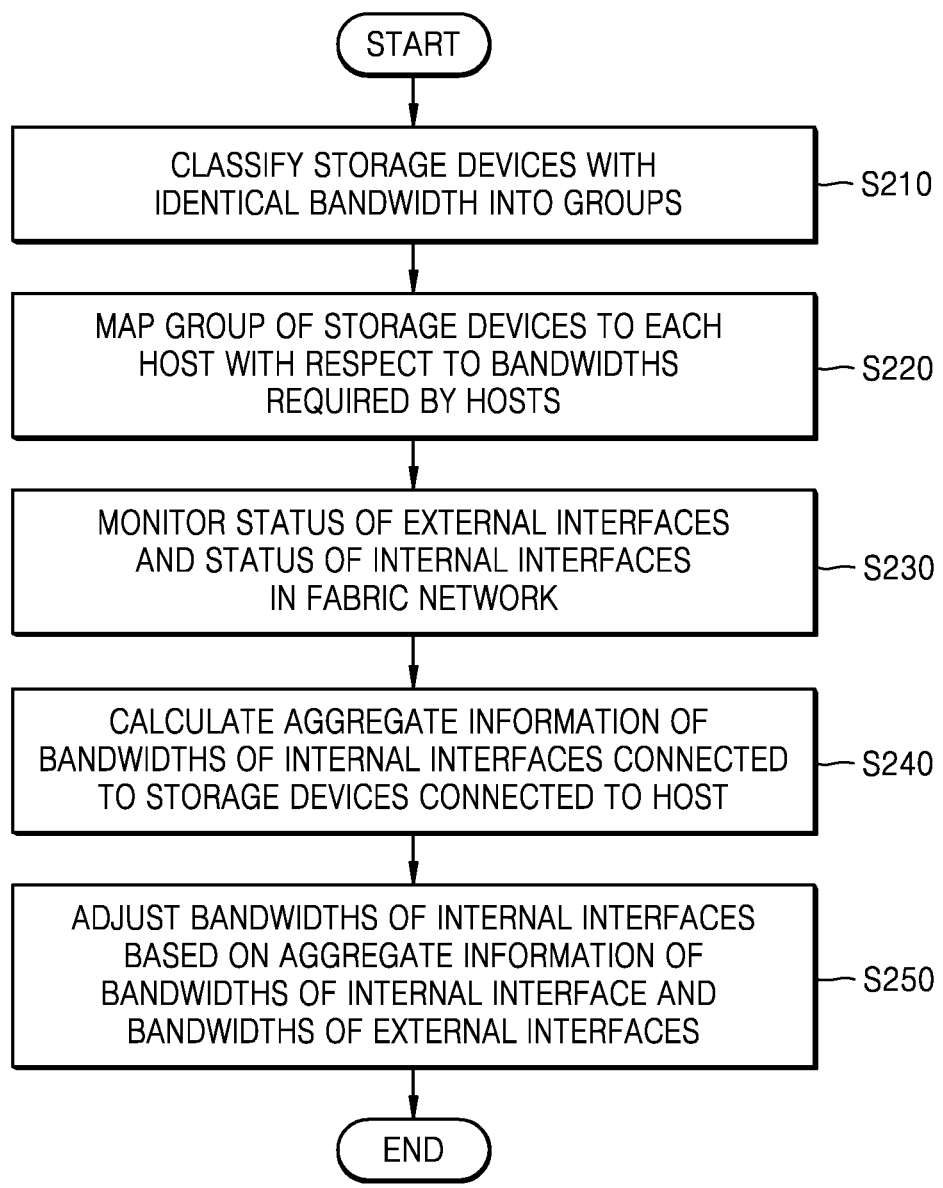
FIG. 17 is another example of a flowchart of a power management method using a fabric network, according to an example embodiment of inventive concepts.

FIG. 17 is another example of a flowchart of a power management method using a fabric network, according to an example embodiment of inventive concepts.

Another example of a power management method performed by the computing systems 1000A, 1000B, or 1000C including the fabric network system 100 of FIG. 1 by adjusting bandwidth of an internal interface will be described with reference to the flowchart of FIG. 17.

Based on bandwidths, at S210 the monitoring control 120 of the fabric network system 100 may classify storage devices that access a fabric network and have with an identical bandwidth into groups. Therefore, the storage devices may be divided into a plurality of bandwidth groups.

Next, at S220, the controller 130 of the fabric network system 100 may map the groups of storage devices to hosts according to bandwidths required by each of the hosts that access the fabric network. For example, for each of the hosts, the controller 130 of the fabric network system 100 may map storage devices in an identical group according to the bandwidths required by each of the hosts.

Next, at S230, the monitoring control 120 of the fabric network system 100 may monitor status of external interfaces connected to the hosts and status of internal interfaces connected to the storage devices in the fabric network. For example, a monitoring operation may be performed in real time.

Next, at S240, the controller 130 of the fabric network system 100 may calculate aggregate information of the bandwidths of the internal interfaces of the storage devices connected to the hosts.

Next, at S250, the fabric network system 100 may adjust the bandwidths of the internal interfaces based on the aggregate information of the bandwidths of the internal interfaces and the bandwidths of the external interfaces. For example, the controller 130 of the fabric network system 100 may adjust the bandwidths of the internal interfaces of the storage devices in bandwidth groups. As another example embodiment, the fabric network system 100 may adjust the bandwidths of the internal bandwidths by changing respective bandwidth groups of the storage devices 200-1 to 200-N.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that various changes in form and details may be made therein without departing from the spirit and scope of the following claims.

What is claimed is:

1. A power management method using a fabric network, the power management method comprising:
monitoring a status of at least one of a number of external interfaces between the fabric network and at least one host, and monitoring a status of at least one of a plurality of internal interfaces between the fabric network and at least one storage device, the at least one host configured to access the at least one storage device through the fabric network;
calculating aggregate information of bandwidths of the plurality of internal interfaces based on the monitoring of the status of the at least one of the number of external interfaces and the at least one host; and
adjusting the bandwidths of the plurality of internal interfaces such that the aggregate information of the bandwidths of the plurality of internal interfaces is within a threshold range, the threshold range being based on a bandwidth of the at least one of the number of external interfaces connected to the at least one host.

2. The power management method of claim 1, wherein the monitoring the status of the at least one of the number of external interfaces includes,
detecting the bandwidth of the at least one of the number of external interfaces based on external interface bandwidth configuration information, and
the monitoring the status of the at least of the plurality of internal interfaces includes,
detecting the bandwidths of the plurality of the internal interfaces based on internal interface bandwidth configuration information.

3. The power management method of claim 1, wherein the adjusting the bandwidths of the plurality of internal interfaces includes,
setting a first bandwidth of the threshold range as a sum of (i) the bandwidth of the at least one of the number of external interfaces and (ii) a first threshold value, and
setting a second bandwidth of the threshold range as a sum of (i) the bandwidth of the at least one of the number of external interfaces and (ii) a second threshold value, the second threshold value is greater than the first threshold value.

4. The power management method of claim 3, further comprising:
maintaining an input/output performance according to the bandwidth of the at least one of the number of external interfaces based on the first and second threshold values; and
reducing a power consumption by the at least one storage device while maintaining the input/output performance.

5. The power management method of claim 4, further comprising:
determining the first threshold value and the second threshold value based on empirical data.

6. The power management method of claim 1, wherein the adjusting the bandwidths of the plurality of internal interfaces includes,
determining the threshold range based on a correlation between a number of the at least one storage device configured to access the fabric network, an input/output performance of the bandwidths of the plurality of internal interfaces, and power consumption of the at least one storage device.

7. The power management method of claim 1, wherein the calculating calculates the aggregate information of the bandwidths of the plurality of internal interfaces if a plurality of the at least one host access the fabric network.

8. The power management method of claim 7, wherein the adjusting the bandwidths of the plurality of internal interfaces includes, adjusting the bandwidths of the plurality of internal interfaces based on bandwidths of the number of external interfaces such that the aggregate information of the bandwidths of the plurality of internal interfaces is within the threshold range, the bandwidths of the number of external interfaces connected to the plurality of the at least one host.

9. The power management method of claim 1, further comprising:

mapping groups of a plurality of the at least one storage device to a plurality of the at least one host based on bandwidths of the plurality of the at least one host if the plurality of the at least one host access the fabric network.

10. The power management method of claim 9, wherein the adjusting adjusts the bandwidths of the plurality of internal interfaces based on the calculated aggregate information of the bandwidth of at least one of the plurality of internal interfaces and the bandwidth of the at least one of the number of external interfaces.

11. The power management method of claim 1, further comprising:

connecting the at least one host and the at least one storage device via an interface, the interface includes one of a Component Interconnect Express (PCIe) interface, a Serial Attached Small Computer System Interface (SAS), a Serial Advanced Technology Attachment (SATA) interface, and a network interface.

12. A fabric network system comprising:

a fabric network including a plurality of ports, the fabric network configured to support communication between a host and a plurality of storage devices, the plurality of storage devices connected to access the plurality of ports, a monitor configured to,
monitor a status of an external interface connected to the host, and
monitor statuses of internal interfaces connected to the plurality of storage devices; and a controller configured to,
adjust bandwidths of the internal interfaces based on the monitored status of the external interface and the monitored statuses of the internal interfaces such that a bandwidth used by the host is maintained and power consumption of the plurality of storage devices is reduced.

13. The fabric network system of claim 12, wherein the monitor is further configured to, detect a bandwidth of the external interface based on external interface bandwidth configuration information, and
detect the bandwidths of the internal interfaces based on internal interface bandwidth configuration information from the host.

14. The fabric network system of claim 12, wherein the controller is further configured to, calculate aggregate information of the bandwidths of the internal interfaces based on the monitored status of the external interface and the monitored statuses of the internal interfaces, and
adjust the bandwidths of the internal interfaces such that the calculated aggregate information of the bandwidths of the internal interfaces is within a threshold range based on a bandwidth of the external interface.

15. The fabric network system of claim 12, wherein the controller is further configured to, map groups of the plurality of storage devices to the host based on the bandwidth used by the host if the host accesses the fabric network, and
adjust the bandwidths of the internal interfaces for the mapped groups of the plurality of storage devices.

16. A power management method comprising:

calculating aggregate information of bandwidths of a plurality of storage devices in a storage system, each of the plurality of storage devices configured to access a host connected to a fabric network in the storage system, and
reducing power consumption of the plurality of storage devices by adjusting bandwidths of internal interfaces between the fabric network and the plurality of storage devices based on (i) the calculated aggregate information of the bandwidths of the plurality of storage devices, and (ii) a bandwidth of an external interface between the host and the fabric network.

17. The power management method of claim 16, wherein the reducing the power consumption of the plurality of storage devices includes, adjusting the bandwidths of the internal interfaces such that the calculated aggregate information of the bandwidths of the internal interfaces is within a threshold range, the threshold range based on the bandwidth of the external interface.

18. The power management method of claim 17, wherein the adjusting the bandwidths of the internal interfaces includes, determining whether the threshold range based on the bandwidth of the external interface is further based on (i) a correlation between the plurality of storage devices configured to access the fabric network, (ii) an input-output performance of the bandwidths of the internal interfaces, and (iii) a power consumption value of the plurality of storage devices.

19. The power management method of claim 16, further comprising:

monitoring the bandwidth of the external interface; and
monitoring the bandwidths of the internal interfaces,
wherein the calculating the aggregate information of the bandwidths of the internal interfaces is based on the monitoring of the bandwidth of the external interface and the monitoring of the bandwidths of the internal interfaces.

20. The power management method of claim 16, wherein the reducing the power consumption of the plurality of storage devices includes, maintaining an input-output performance of the bandwidth of the external interface.

* * * * *